Aug. 12, 1947.  B. M. LE VANGIE  2,425,431
MANUFACTURE OF CHOCOLATE ARTICLES
Filed Nov. 12, 1943

Inventor
Benjamin M. LeVangie.
By Cameron, Kerkam & Sutton
Attorneys

UNITED STATES PATENT OFFICE 2,425,431

MANUFACTURE OF CHOCOLATE ARTICLES

Benjamin M. Le Vangie, Randolph, Mass., assignor, by mesne assignments, to General Foods Corporation, New York, N. Y., a corporation of Delaware Application November 12, 1943, Serial No. 510,002

7 Claims. (Cl. 99—23)

This invention relates to the production of chocolate products, such as molded chocolate bars, confections and the like, which comprise two or more layers of chocolate.

In the usual procedure of casting chocolate bars and the like, tempered melted chocolate is poured or otherwise deposited in a mold and agitated or shaken therein to remove air bubbles, obtain an even thickness, and make sure that the corners of the mold and any intricate designs therein are filled with chocolate. The chocolate is then cooled, usually by moving the mold through a cooling tunnel, until it freezes or solidifies and at the same time contracts somewhat away from the walls of the mold. The finished bar is then suitably removed as by inverting and tapping the mold to cause it to drop out.

It is desirable for certain purposes to make such bars or other chocolate articles of two or more superposed layers of chocolate which are separately poured or deposited one on another but which are securely bonded together to form an integral article. Depending on the nature and purposes of the product, the successive layers may desirably be of the same or different kinds of chocolate. For example, it may be desired to provide a mixed layer of nuts and chocolate enclosed between two layers of chocolate, in which case the enclosing layers may consist either of the same or of different kinds of chocolate. On the other hand, chocolate bars comprising alternate distinct layers of contrasting light and dark colored chocolate present a novel and attractive appearance, and also make possible various desirable and pleasing taste combinations. For example, the first taste effects observed on eating a bar comprising separate layers of sweet milk chocolate and stronger but less sweet vanilla chocolate are the sweetness and richness of the milk chocolate, but the final taste effect is that of the vanilla chocolate. Also the contrasting colors of the layers add variety to the appearance of the product and enhance its appeal to the consumer. Similar effects both as to taste and appearance may be desired in chocolate articles, wafers, and other like chocolate products.

When it is attempted to cast such layers of chocolate one upon another, however, the resulting product is not satisfactory. If the second layer is poured before the first layer has been frozen, the layers tend to mix and their separate identity is lost, particularly in view of the shaking or agitation to which the chocolate is subjected as described above. On the other hand, if the first layer is frozen before the second layer is deposited thereon, the layers in the finished bar do not stick together but easily split part on shipment or handling or when the bar is eaten. Moreover the contraction of the first layer on freezing allows the melted chocolate of the second layer to run down into the mold around the edges of the first layer. Still further, the mold having been chilled before the second layer is poured, it is difficult to avoid sticking of the bar in the mold.

The above difficulties are overcome by my invention and a product is obtained in which the successive layers are separate and distinct and yet integrally bonded together. The melted chocolate comprises a mixture of liquid cocoa butter fats of various solidification or melting temperatures, together with solid particles of sugar, non-fat cocoa solids, flavoring materials, etc., and in the case of milk chocolate also milk solids and liquid milk fats. The liquid fats form a continuous phase in which the solids are held in suspension. When the melted chocolate is subjected to the customary tempering before depositing in the mold, some of the sensible heat is removed and a small amount of the higher melting point fats gives up its latent heat as well, forming a suspension of fine seed crystals uniformly distributed in the still liquid mass. On further cooling after the chocolate has been deposited in the mold, the seed crystals induce the crystallization of most of the remaining fats and the product solidifies, the interlocking fat crystals holding the solids in place. The physical characteristics of the product are thus due mainly to its crystalline nature, while its color depends essentially on the nature and amount of non-fat solids present.

I have found that when the cooling of the chocolate in the mold is controlled to restrict the extent of crystallization within proper limits, the partially cooled mass of chocolate contains enough crystals of higher melting point fats to provide sufficient structural strength to receive and support a second layer, the first layer maintaining its physical identity and particularly retaining its non-fat solids substantially without mixing with those of the second layer. At the same time the partially cooled chocolate contains a substantial amount of uncrystallized fats and when the superposed layer is deposited, the uncrystallized fats of the two layers unite in a continuous liquid phase while the non-fat coloring solids are maintained in distinct zones. On further cooling, the fat crystals extend from one layer to another and interlock in a continuous crystalline structure, providing what is in effect a welded bond between the layers with substantially the same structural strength and other physical characteristics as the chocolate in the respective layers.

In terms of the extent of crystallization, the desired conditions set forth above are obtained when about 10-40% of the liquid fat content of the melted chocolate has been crystallized. If less than about 10% of the fat has been crystallized, the structural strength of the supporting layer is not sufficient to prevent mixing of the layers and blurring of the line of demarcation between them, especially during the shaking of the superposed layer. On the other hand, if more than about 40% of the fat has been crystallized, the bond produced between the layers is unsatisfactory. Instead of a continuous crystalline structure between layers, a distinct separation of the layers is visible under the microscope, and they split apart readily.

It will be understood that within these limits, the optimum percentage of crystallization varies somewhat depending on the fat content of the chocolate. As the variation in fat content acceptable for eating chocolate is small, however, the limits cover the workable range. Moreover, it will be understood that within these limits the partially cooled supporting layer has not been contracted away from the walls of the mold when the superposed layer is deposited thereon, nor has the mold been chilled sufficiently to cause sticking of the superposed layer.

The degree of crystallization produced under given conditions can be determined in any suitable manner. For example, a specimen of the chocolate can be tested by means of heating with a constant rate of heat input, whereby the latent heat required to melt the crystallized fat can be determined and the amount then calculated allowing for its specific heat. In practice, however, it will be sufficient as a rule to employ controlled cooling procedures based on the examples given hereinafter, with appropriate adjustment of cooling conditions according to variations in the size and shape of the molds employed, etc.

The accompanying drawings illustrate photomicrographically the structure of a product embodying the invention, and also show diagrammatically various types of products to which the invention can be applied as well as a suitable sequence of operations and arrangement of apparatus for practicing the process. It is to be expressly understood, however, that said drawings are for purposes of illustration only, and are not to be taken as a definition of the limits of the invention, reference being had to the appended claims for this purpose.

In said drawings.

Figure 1:
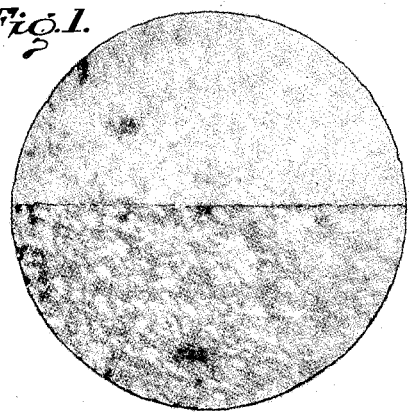
Figs. 1 and 2 are photomicrographs illustrating respectively the structure of a product in which the supporting layer was solidified in the usual way before the superposed layer was deposited thereon, and the structure of a product embodying the present invention.
Figure 2:
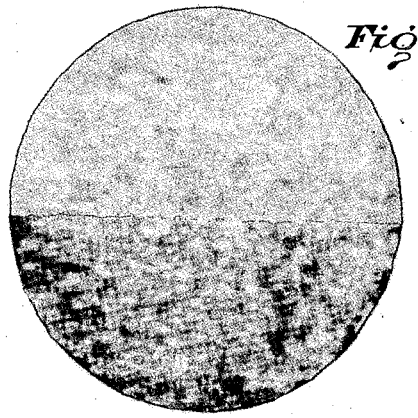

The photomicrographs of Figs. 1 and 2 were taken under polarized light so that the fat crystals appear as white masses. The darker portions of the pictures are due to the presence of cocoa and other solids held in place by the crystalline structure of the material. Layers of contrasting light and dark chocolate were used in each specimen so that the line of division between the layers would be apparent on the photographs. In Fig. 1, the line of division between the light and dark layers is clear and sharp, and over part of the field they are separated by a black line indicating the presence of an air film between them. On the other hand, there is no evidence of interlocking crystal structure between the layers. Such products split apart readily.

In Fig. 2, there is a clear difference between the light and dark layers from the standpoint of color and appearance, even at large magnification, and it will be understood that when allowance is made for the magnification, the line of separation between the layers in the actual product is sharp and distinct. This is due to the fact that the non-fat solids principally responsible for color are retained in separate and distinct layers. There is, however, no separation and no air film between the layers; on the contrary the crystals of the two layers form a continuous uniform structure, the superposed layers being welded together by the interlocking fat crystals and forming an integral product of substantially uniform structural characteristics throughout.

In carrying out the process, the melted chocolate for the various layers to be formed is tempered in the usual manner as explained above. For example, the chocolate is cooled slowly with agitation to a temperature of 85°–88° F. in the case of dark chocolate, or 83°–86° F. in the case of light milk chocolate. In this condition, relatively slight cooling of the liquid results in further crystallization of higher melting point fats to the extent set forth above, so that the chocolate no longer behaves as a liquid but constitutes a mass capable of receiving and supporting the next layer without mixing. Accordingly the chocolate for the first layer is deposited in the mold and shaken in the usual manner, after which it is subjected to slight cooling sufficient to produce the condition described above. For example, the mold may be passed through a cold box, the time and temperature of the treatment being regulated to obtain cooling within the limits stated above, or the desired condition may be obtained by means of a stream of cooling air directed onto the surface of the chocolate in the mold, either during or after shaking the mold, or both. Either method can readily be utilized with the usual mold conveyor apparatus by providing alternate depositing and cooling stages along the path of travel of the mold.

After the supporting layer is cooled as above described, the superposed layer is poured or deposited on it and the mold is again shaken. Less shaking is necessary because the initial layer presents a flat surface, but on the other hand some shaking is desirable to make sure that the liquid fat of the two layers is brought thoroughly into contact. These operations are repeated until the desired number of layers has been built up, after which the mold is passed through a cold box or tunnel or subjected to cooling air at a lower temperature or for a longer time until completely frozen and ready for demolding. Thus only one freezing operation is required, whatever the number of layers.

The temperature and time of cooling to obtain the desired partially frozen condition will vary widely depending on tempering conditions, the size and shape of the mold, the fat content and viscosity of the chocolate and also its type, i. e., whether light or dark, etc. In the case of streams of cooling air, moreover, not only the temperature and time but also the velocity of the air must be taken into account. By way of example, good results were obtained in making chocolate bars comprising two layers of light milk chocolate with an intermediate layer of dark chocolate in the following manner. The light chocolate had a total fat content of 35% and a viscosity of 106 centipoises, while the dark chocolate had a total fat content of 36% and a viscosity of 103 centipoises. The molds were 7¾" x 3¾" x ⅝", the bars having a weight of 6 oz. each. The cooling air temperature was 42° F. and its velocity 800 feet per minute. The chocolate was tempered according to generally accepted practice in the art, and the layers poured at a temperature around 85° F., the molds being first brought to a temperature of 80°–84° F. Each of the first two layers was subjected to the stream of cooling air for about 50 seconds, reducing its temperature to about 75° F. before the next layer was deposited. After the third layer was deposited, the mold was subjected to the stream of cooling air for 30 minutes, by which time the temperature of the upper layer was reduced to about 65° F. and the bar was ready for demolding.

In the case of a 1½ oz. bar of the same chocolate, using a mold 3 1/16" x 2 1/16" x ⅜" at 80–84° F., the time of exposure of the first two layers to the cooling air stream specified above was cut from 50 to 40 seconds, with a resulting drop in temperature of the layers to 70° F. instead of 75° F. Exposure of this bar to the cooling air for 15 minutes after the third layer was deposited similarly reduced the temperature of the latter to 55° F. instead of 65° F., after which the bar was demolded.

In making a 1½ oz. two-layer bar in a cooling tunnel, molds of the size described above were again brought to a temperature of 80°–84° F. Light chocolate as described above was tempered to 83°–86° F. and deposited in the molds as the first layer, after which the molds were shaken and passed through a short cooling tunnel for 45–60 seconds, the air temperature being 40° F. On emergence the temperature of the chocolate was about 75° F. The above described dark chocolate, tempered to 85°–88° F., was then deposited as a second layer and the molds after further shaking were passed through a long cooling tunnel for 20 minutes, the air temperature being 40° F. The bars were then demolded.

Again, in making a ⅓ oz. two-layer wafer 1⅞" in diameter and ¼" thick at the center, the mold was brought to a temperature of 80–84° F. and the light chocolate tempered as described above was deposited and the mold shaken and passed through a short cooling tunnel for 40–45 seconds, the air temperature being 45° F. The temperature of the chocolate on emergence was again 70° F. The second layer of dark chocolate, tempered as above described, was then deposited and the mold shaken and passed through the long cooling tunnel for 20 minutes, the air temperature being 45° F. The wafers were then demolded.

Obviously the procedures stated above can be repeated any desired number of times depending on the number of layers desired in the final product.

Figure 3:
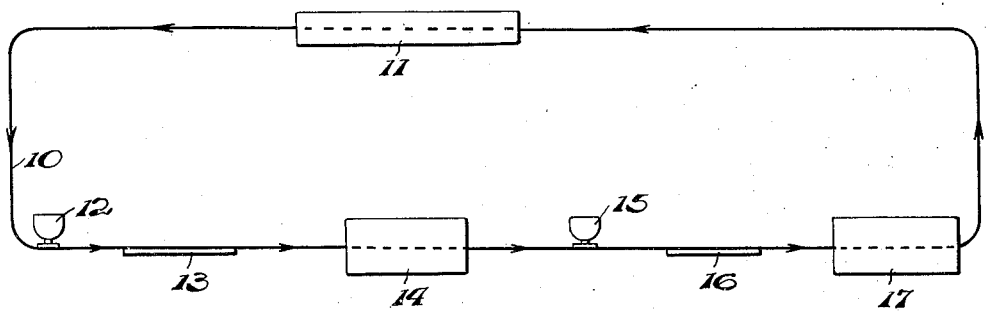
Fig. 3 illustrates diagrammatically a suitable sequence of operations and arrangement of apparatus for practicing the invention.

Fig. 3 shows a suitable arrangement of apparatus for making a two-layer article. The molds are carried by any suitable conveyor, indicated diagrammatically by the line 10 and moving in the direction of the arrows. The molds are conditioned to receive the chocolate in the conditioning unit 11. The first layer of tempered chocolate is deposited in the molds at 12, after which the molds are shaken at 13 and then moved through a cooling unit 14 as above described. The first layer being now properly conditioned, the second layer is deposited in the molds at 15, after which they are again shaken at 16 and finally passed through a cooling unit 17 which completes the solidification of both layers. The chocolate articles are knocked out of the molds in the usual manner as they pass from the cooler 17 back to the conditioning unit 11.

Figure 4:
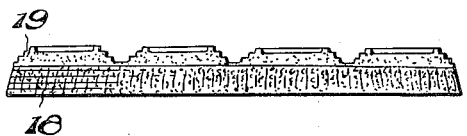
Figs. 4 and 5 illustrate different types of products to which the invention may be applied.
Figure 5:
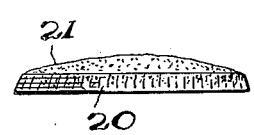

Figs. 4 and 5 illustrate by way of example how the invention can be utilized to produce chocolate articles of novel and attractive appearance. The chocolate bar shown in Fig. 4 comprises a base 18 of dark colored chocolate with a plurality of light colored chocolate mounds 19 of distinctive shape on its upper surface. Figure 5 shows a circular chocolate wafer comprising a bottom disc 20 of dark colored chocolate and a central upper disc of light colored chocolate. Many different arrangements are possible in producing varicolored chocolate bars, wafers, molded figures of various kinds, etc., and various desirable ornamental effects can be obtained.

It will be apparent that the invention is not restricted to the particular examples set forth above, and that other similar applications of the invention will readily occur to those skilled in the art, as well as variations in the details of procedure. Reference is therefore to be had to the appended claims for a definition of the limits of the invention.

What is claimed is:

1. The method of making chocolate articles having a plurality of superposed distinct layers of chocolate united integrally over substantially their entire areas which comprises tempering the melted chocolate for the layers, depositing the tempered chocolate for a supporting layer in a mold, partially cooling the chocolate in the mold until 10–40% of its fat content is crystallized to form a substantially non-fluid mass capable of supporting a superposed layer substantially without mixing of the layers, then depositing a superposed layer of tempered chocolate on the supporting layer in the mold, and then cooling the mass to cause crystallization and solidification throughout both layers with the fat crystals of the layers forming a continuous crystalline structure whereby the layers are integrally united.

2. The method of making chocolate articles having a plurality of superposed distinct layers of chocolate united integrally over substantially their entire areas which comprises tempering the melted chocolate for the layers, depositing the tempered chocolate for a supporting layer in a mold, subjecting the chocolate in the mold to a current of cooling air at a temperature and velocity sufficient to crystallize between 10 and 40% of its fat content, thereby forming a substantially non-fluid mass capable of receiving and supporting a superposed layer substantially without mixing, then depositing a superposed layer of tempered chocolate on the supporting layer in the mold, and then cooling the mass to cause crystallization and solidification throughout both layers with the fat crystals of the layers forming a continuous crystalline structure, whereby the layers are integrally united.

3. The method of making chocolate articles having a plurality of superposed distinct layers of chocolate united integrally over substantially their entire areas which comprises tempering the melted chocolate for the layers, depositing the tempered chocolate for a supporting layer in a mold, passing the chocolate and mold through a cooling chamber at a temperature and for a time sufficient to crystallize between 10 and 40% of its fat content, thereby forming a substantially non-fluid mass capable of receiving and supporting a superposed layer substantially without mixing, then depositing a superposed layer of tempered chocolate on the supporting layer in the mold, and then cooling the mass to cause crystallization and solidification throughout both layers with the fat crystals of the layers forming a continuous crystalline structure, whereby the layers are integrally united.

4. The method of making chocolate articles having a plurality of distinct portions of chocolate of different colors which are united integrally over substantially their entire areas comprising tempering the chocolate for the portions, depositing the tempered chocolate for one portion in a mold, partially cooling the chocolate in the mold until 10–40% of its fat content is crystallized and thereby providing a substantially non-fluid mass capable of receiving and supporting a superposed portion without substantial mixing of the non-fat coloring solids of said portions, then depositing another portion on the first portion in the mold whereby the uncrystallized fats of the two portions unite to form a continuous liquid phase while the non-fat coloring solids are maintained in distinct zones of different colors, and then cooling the mass to cause crystallization and solidification of said continuous liquid phase throughout both portions.

5. The method of making chocolate articles having a plurality of distinct portions which are united integrally over substantially their entire areas comprising tempering the chocolate for the portions, depositing the tempered chocolate for one portion in a mold, partially cooling the chocolate in the mold until 10–40% of its fat content is crystallized and thereby providing a substantially non-fluid mass capable of receiving and supporting a superposed portion without substantial mixing of said portions, then depositing a second portion on the first portion in the mold whereby the uncrystallized fats of the two portions unite to form a continuous liquid phase, then partially cooling the second portion and depositing a third portion thereon as before, said partial cooling and depositing operations being repeated the number of times required to deposit the desired number of portions, and finally cooling the mass to complete solidification of said continuous liquid phase as a continuous crystalline structure extending through all of said portions.

6. A vari-colored chocolate article having a continuous, substantially uniform fat crystal structure throughout and comprising portions each characterized by having its content of non-fat coloring solids uniformly distributed but different in color and separate and distinct from the non-fat coloring solids of adjacent portions.

7. A multi-layer chocolate bar having its fat content in the form of a continuous, substantially uniform crystalline structure throughout, thereby forming a solid bar of uniform strength regardless of layers, the layers each characterized by having its non-fat coloring solids distributed uniformly throughout but different in color and separate and distinct from the non-fat coloring solids of an adjacent layer.

BENJAMIN M. LE VANGIE.

REFERENCES CITED

The following references are of record in the file of this patent:

UNITED STATES PATENTS

| Number | Name | Date |
| --- | --- | --- |
| 1,467,351 | Blunt | Sept. 11, 1923 |
| 1,790,361 | Winkler et al. | Jan. 27, 1931 |
| 1,793,263 | Trap | Feb. 17, 1931 |
| 2,163,579 | Bianchi | June 27, 1939 |
| 2,217,392 | Warfield | Oct. 8, 1940 |